(12) United States Patent
Okamoto et al.

(10) Patent No.: US 6,812,675 B2
(45) Date of Patent: Nov. 2, 2004

(54) A.C. GENERATOR CONTROL APPARATUS AND METHOD HAVING ABNORMALITY INFORMATION OUTPUT FUNCTION

(75) Inventors: Nobuhito Okamoto, Chiryu (JP); Toshinori Maruyama, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/207,962

(22) Filed: Jul. 31, 2002

(65) Prior Publication Data

US 2003/0042875 A1 Mar. 6, 2003

(30) Foreign Application Priority Data

Aug. 30, 2001 (JP) ........................................ 2001-261095

(51) Int. Cl.⁷ .............................. H02H 7/06; H02H 7/08; H02J 7/14; H02P 9/38
(52) U.S. Cl. ............................ 322/28; 322/24; 322/25; 322/29
(58) Field of Search .............................. 322/17, 24–25, 322/28–29

(56) References Cited

U.S. PATENT DOCUMENTS

| | | | | |
|---|---|---|---|---|
| 4,063,307 A | * | 12/1977 | Stephens ................... | 363/21.17 |
| 4,180,852 A | * | 12/1979 | Koizumi et al. ............... | 363/49 |
| 4,322,630 A | * | 3/1982 | Mezera et al. ............. | 290/40 C |
| 4,362,982 A | * | 12/1982 | Akita et al. .................. | 320/123 |
| 4,451,776 A | * | 5/1984 | Iwaki et al. .................... | 322/22 |
| 4,694,238 A | * | 9/1987 | Norton ........................ | 322/28 |
| 4,727,307 A | * | 2/1988 | Kaneyuki et al. ............. | 322/22 |
| 4,751,629 A | * | 6/1988 | Shimizu et al. ............... | 363/37 |
| 4,973,896 A | * | 11/1990 | Shiga et al. ................... | 322/28 |
| 5,061,889 A | * | 10/1991 | Iwatani et al. ................ | 322/28 |
| 5,144,220 A | * | 9/1992 | Iwatani et al. ................ | 322/28 |
| 5,256,959 A | * | 10/1993 | Nagano et al. ............... | 322/25 |
| 5,260,641 A | * | 11/1993 | Iwatani ........................ | 322/28 |
| 5,491,400 A | * | 2/1996 | Iwatani et al. ................ | 322/28 |
| 5,497,071 A | * | 3/1996 | Iwatani et al. ................ | 322/28 |
| 5,561,363 A | * | 10/1996 | Mashino et al. .............. | 322/25 |
| 5,581,172 A | * | 12/1996 | Iwatani et al. ................ | 322/28 |
| 5,675,237 A | * | 10/1997 | Iwatani ........................ | 322/28 |
| 5,686,819 A | * | 11/1997 | Iwatani et al. ................ | 322/25 |
| 5,767,636 A | * | 6/1998 | Kanazawa et al. .......... | 318/139 |
| 5,886,500 A | * | 3/1999 | Iwatani et al. ............... | 320/104 |
| 6,014,016 A | * | 1/2000 | Maruyama et al. ........... | 322/28 |
| 6,134,123 A | * | 10/2000 | Yamada .................... | 363/21.13 |
| 6,344,734 B1 | * | 2/2002 | Iwatani et al. ................ | 322/28 |
| 6,384,551 B1 | * | 5/2002 | Watanabe ................... | 318/139 |
| 6,420,855 B2 | * | 7/2002 | Taniguchi et al. ............ | 322/28 |
| 6,486,640 B2 | * | 11/2002 | Adams ........................ | 322/59 |
| 6,548,990 B2 | * | 4/2003 | Okuno et al. ................ | 322/36 |
| 6,614,207 B2 | * | 9/2003 | Maehara et al. ............. | 322/28 |
| 6,664,767 B2 | * | 12/2003 | Takahashi et al. ............ | 322/28 |
| 6,696,773 B2 | * | 2/2004 | Taniguchi ................... | 307/153 |
| 6,700,354 B2 | * | 3/2004 | Okuno et al. ................ | 322/29 |
| 6,707,275 B2 | * | 3/2004 | Okahara et al. ............. | 322/24 |
| 6,707,276 B2 | * | 3/2004 | Takahashi et al. ........... | 322/28 |
| 6,707,278 B2 | * | 3/2004 | Harmon ...................... | 322/37 |
| 6,717,385 B2 | * | 4/2004 | Asada et al. ................. | 322/24 |
| 6,734,653 B2 | * | 5/2004 | Taniguchi et al. ............ | 322/24 |
| 6,737,835 B2 | * | 5/2004 | Taniguchi ................... | 322/29 |
| 6,750,635 B2 | * | 6/2004 | Harmon ...................... | 322/29 |

FOREIGN PATENT DOCUMENTS

JP        U 60-181200        12/1985

* cited by examiner

Primary Examiner—Joseph Waks
Assistant Examiner—Pedro J. Cuevas
(74) Attorney, Agent, or Firm—Oliff & Berridge, PLC

(57) ABSTRACT

A voltage regulator for an a.c. generator produces a power generation ratio signal having a duty ratio corresponding to the current supply to the field winding of the a.c. generator. This power generation ratio signal is applied to an external apparatus through a signal wire. The duty ratio of the power generation ratio signal is more than 10% when the a.c. generator is normal. When abnormality is detected, the power generation ratio signal is partly masked by an abnormality detection signal so that the duty ratio of the power generation signal is reduced to be less than 10% and this change may be detected by the external apparatus. Alternatively, the power generation ratio signal may be transmitted only intermittently when the abnormality is detected.

17 Claims, 3 Drawing Sheets

US 6,812,675 B2

A.C. GENERATOR CONTROL APPARATUS AND METHOD HAVING ABNORMALITY INFORMATION OUTPUT FUNCTION

CROSS REFERENCE TO RELATED APPLICATION

This application is based on and incorporates herein by reference Japanese Patent Application No. 2001-261095 filed Aug. 30, 2001.

FIELD OF THE INVENTION

The present invention relates to a control apparatus and method for controlling an alternating current generator mounted on vehicles, and more particularly to the control apparatus and method which outputs abnormality information to an external apparatus.

It is recently proposed to use the power generation ratio of an alternating current (a.c.) generator as a parameter in an engine control thereby to stabilize idling rotation of the engine. In JP-U-60-18120, an a.c. generator is constructed to output to an external electronic apparatus a field coil voltage signal from the junction between its field coil and its voltage regulator through a current limiting resistor. The external apparatus is thus enabled to estimate mechanical torque or the like of the generator from the power generation ratio of the generator and control an idle control valve of an engine for stabilizing the engine idle speed.

The external apparatus requires as much information as possible for engine control. Such information includes, in addition to the power generation ratio, malfunction indicative of malfunction of the generator. However, because the field coil voltage signal does not include such information other than the power generation ratio, additional signal wires must be added to the field coil voltage signal wire. It is not desirable to increase signal wires, because wiring the signal wires becomes complicated and breakage and shorting of the signal wires become more likely.

SUMMARY OF THE INVENTION

It is therefore an object of the present invention to provide an a.c. generator control apparatus and method which enables detection of malfunction of an a.c. generator without increasing signal wires.

According to the present invention, current supply to a field winding of an a.c. generator is turned on and off in a variable duty ratio within a predetermined range at every predetermined cycle period thereby to regulate an output voltage of the generator. A power generation ratio output signal is produced in a pulse form having a duty ratio corresponding to the duty ratio of the current supply to the field winding. The output signal is transmitted to an external apparatus through a signal wire. The output signal transmitted to the external apparatus is changed depending on whether an abnormality in the a.c. generator is detected. The change of the output signal may be a change of the duty ratio of the output signal to a duty ratio that is outside the predetermined range. Alternatively, the change may be a stop of transmission of the output signal to the external apparatus for a period longer than the predetermined cycle period.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
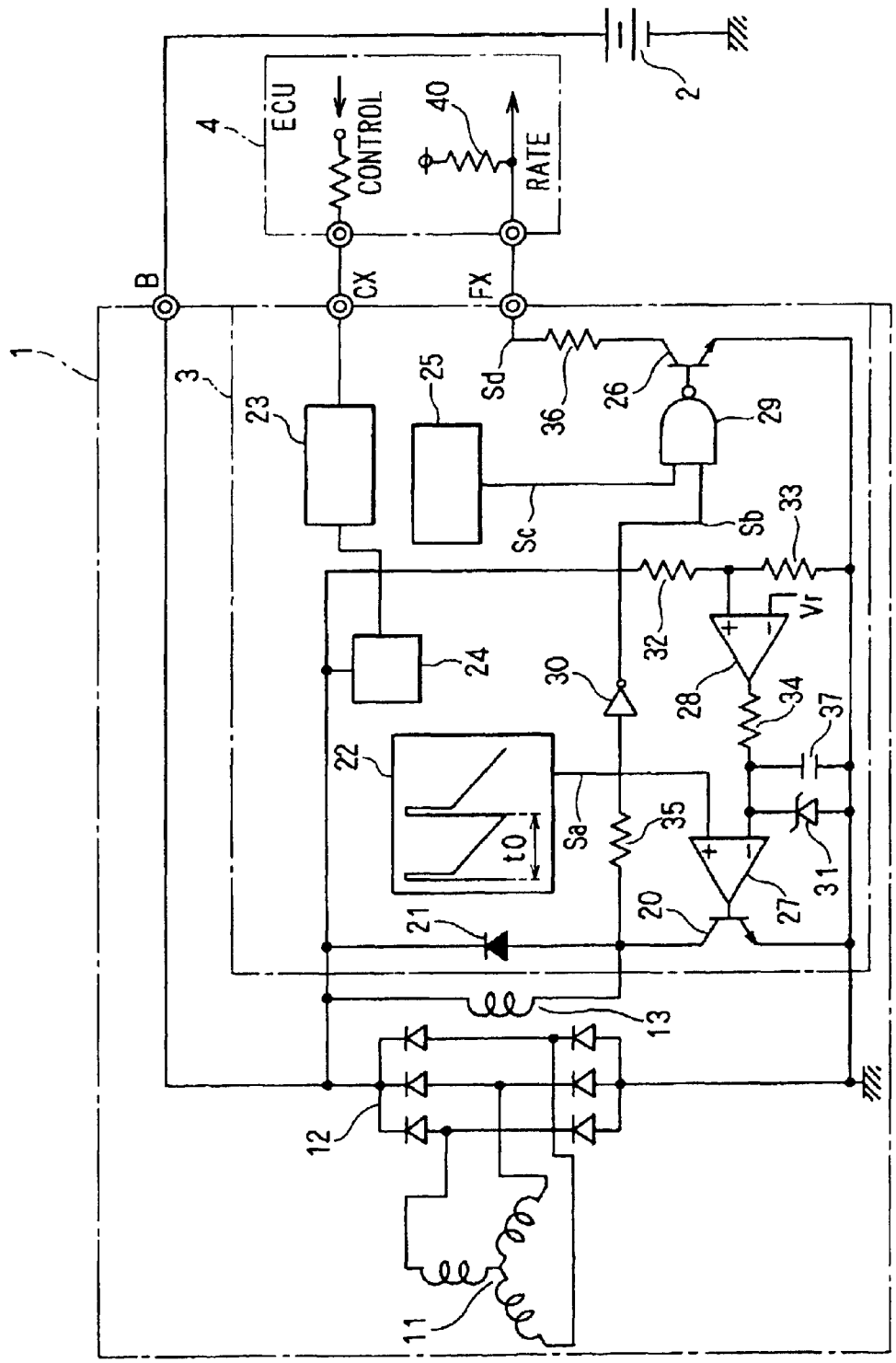
FIG. 1 is a circuit diagram showing a vehicle a.c. generator regulator apparatus according to the first embodiment of the present invention.

Referring first to FIG. 1, a vehicle a.c. generator 1 has three-phase stator windings 11 wound in a stator (not shown), a rectifier circuit 12 which full-wave rectifies output voltages of the stator windings 11, a field winding 13 wound in a rotor (not shown), and a voltage regulator apparatus 3 which controls a field current supplied to the field winding 13 thereby to regulate the output voltage of the rectifier circuit 12. The a.c. generator 1 has an output terminal (B-terminal) connected to a battery 2 and various electric loads (not shown) in a vehicle. The a.c. generator 1 further has an output terminal (FX-terminal) and an input terminal (CX-terminal). Those terminals are connected to an external electronic control unit (ECU) 4 to transmit a power generation ratio signal to the ECU 4 and to receive a control signal from the ECU 4, respectively.

The voltage regulator apparatus 3 is for regulating the output voltage at the B-terminal to a regulated voltage (for instance 14 volts). It includes a power transistor 20, a flywheel diode 21, a pulse generator 22, an external signal receiver circuit 23, a power supply circuit 24, an abnormality detection circuit 25, a transistor 26, comparators 27, 28, a NAND circuit 29, an inverter circuit 30, a Zener diode 31, resistors 33 through 36, and a capacitor 37.

The power transistor 20 is connected in series with the field winding 13 to turn on and off the field current supplied to the field winding 13. The flywheel diode 21 is connected in parallel with the field winding 13 to flywheel the field current when the transistor 20 turns off.

The pulse generator 22 is constructed to generate a periodic signal which is a composite of a triangular signal of a peak voltage 5 volts and of a cycle period t0 and a pulse signal of a peak voltage 8 volts of period t1 (t0/10) in each period t0. The external signal receiver circuit 23 is constructed to receive the control signal applied from the ECU 4 through the CX-terminal. The power supply circuit 24 is constructed to start supplying an operating voltage to various circuits in the voltage regulator apparatus 3, when the control signal is received by the external signal receiver circuit 23.

The abnormality detection circuit 25 is constructed to detect abnormality in the a.c. generator 1 and generate an abnormality detection signal of a predetermined period and duty ratio, when any abnormality is detected.

The voltage at the B-terminal is divided by the resistors 32 and 33 and applied to the non-inverting input of the comparator 28, and a reference voltage Vr is applied to the inverting input of comparator 28. The voltage Vr is set to correspond to a regulated voltage to which the output voltage of the rectifier circuit 12 is regulated. The output voltage of the comparator 28 is smoothed by a smoothing circuit comprised of the resistor 34 and the capacitor 37 and applied to the inverting input of the comparator 27. The comparator 27 is connected to the pulse generator 22 to receive the periodic signal at its non-inverting input. The Zener diode 31 has a breakdown voltage of 5 volts to regulate the voltage applied to the inverting input of the comparator 27 to be 5 volts at maximum. The output signal produced from the comparator 27 is applied to the base of the power transistor 20. As a result, the transistor 20 is turned on by a minimum duty ratio of 10%, even when the voltage applied to the inverting input of the comparator 27 is at the highest, that is, 5 volts.

The collector of the transistor 20 is connected to the field coil 13 and the NAND circuit 29 through the inverter circuit 30. The abnormality detection circuit 25 is also connected tot he NAND circuit 29. Thus, the NAND circuit 29 masks a part of the output signal of the inverter circuit 30 by the abnormality detection signal of the abnormality detection circuit 25. The output of the NAND circuit 29 is connected to the base of the transistor 26, the collector and the emitter of which are connected to the FX-terminal through the resistor 36 and grounded, respectively. Thus, the transistor 26 is provided to transmit the on/off output signal of the power transistor 20, which indicates the power generation ratio. The signal wire connecting the FX-terminal and the ECU 4 is terminated by a pull-up resistor 40 in the ECU 4.

Figure 2:
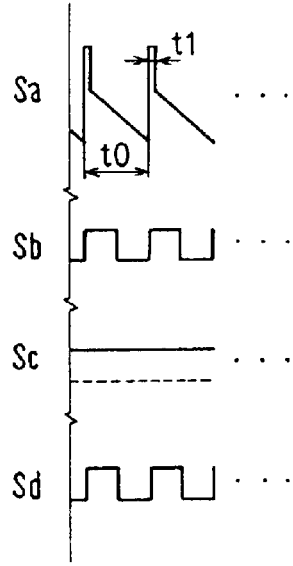
FIG. 2 is a signal diagram showing a mode of generation of a power generation ratio signal in a normal condition in the first embodiment.

FIG. 2 shows a pulse generator output signal Sa, an inverter output signal Sb produced from the pulse generator circuit 22, an abnormality detection signal Sc produced from the abnormality detection circuit 25 and a power generation ratio signal Sd produced from the FX-terminal, when the a.c. generator 1 is operating normally.

In operation, when the control signal indicating a start of electric power generation is applied to the CX-terminal from the ECU 4 distanced from the a.c. generator 1, the power supply circuit 22 starts supplying power with which the voltage regulator apparatus 3 operatios to control the field current supplied to the field winding 13 by the power transistor 20. As long as the a.c. generator 1 is operating normally, that is, no abnormality is detected by the abnormality detection circuit 25, the power generation ratio signal Sd corresponds to the inverter output signal Sb indicative of the on/off operation (duty ratio) of the power transistor 20 as shown in FIG. 2.

Figure 3:
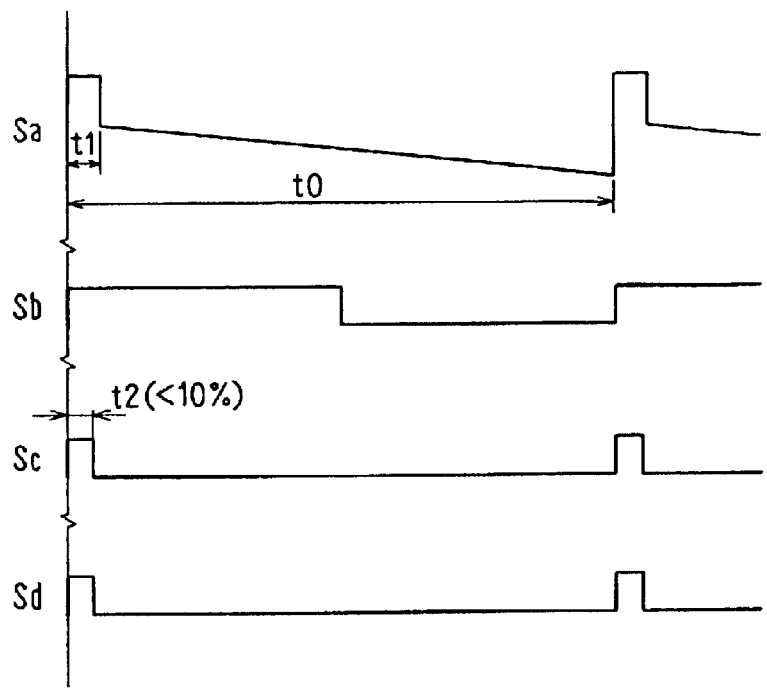
FIG. 3 is a signal diagram showing a mode of generation of the power generation ratio signal in an abnormal condition in the first embodiment.

When any abnormality occurs, the abnormality detection signal Sc is applied to the NAND circuit 29. As shown in FIG. 3, this signal Sc is set to have a period t2 shorter than the period t1 (10% minimum duty ratio) of the periodic signal Sa which is generated at every period t0. As a result, the duty ratio of the power generation ratio signal Sd applied to the ECU 4 through the FX-terminal becomes less than the duty ratio (10%) of the pulse signal Sa.

The voltage regulator apparatus 3 thus reduces the duty ratio of the power generation ratio signal Sd to be lower than the predetermined minimum duty ratio (10%) of the field current. The ECU 4 is thus enabled to check for any abnormality in the a.c. generator 1 from the duty ratio of the power generation ratio signal Sd. Further, the ECU 4 is capable of checking the operating condition of the a.c. generator 1 from the period t0 of the power generation ratio signal Sd. That is, as long as the power generation ratio signal Sd is received from the FX-terminal at every period t0, it can be confirmed that the power transistor 20 is not in the open-malfunction and the a.c. generator 1 is continuing the power generating operation even when the duty ratio (period t2) is less than 10%.

(Second Embodiment)

In this second embodiment, the abnormality detection circuit 25 is constructed to generate the abnormality detection signal in the waveform different from that in the first embodiment.

Figure 4:
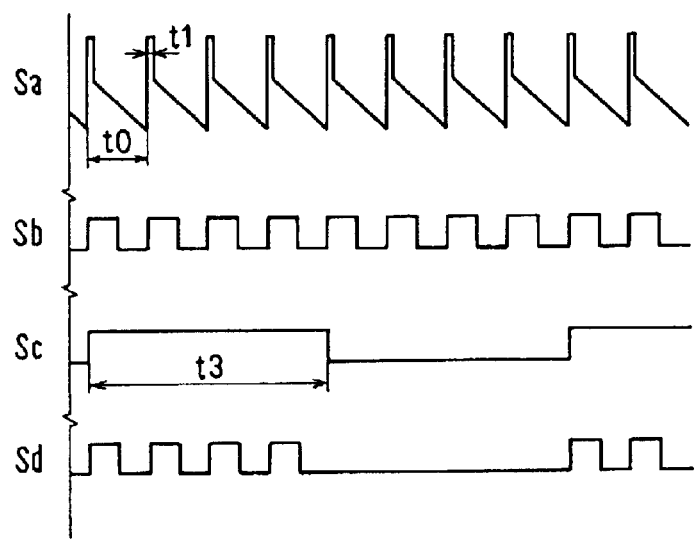
FIG. 4 is a signal diagram showing a mode of generation of the power generation ratio signal in the abnormal condition in the second embodiment of the present invention.

The abnormality detection circuit 25 generates an abnormality detection signal Sc shown in FIG. 4, when any abnormality is detected. The abnormality detection signal Sc continues to hold a high level and a low level alternately. The period t3 of these levels are much longer than the period t0 of the pulse signal Sa. The power generation ratio signal Sd is applied to the ECU 4 through the FX-terminal only when the abnormality detection signal Sc is at the high level. The ECU 4 is thus enabled to detect any abnormality in the a.c. generator 1 by checking whether the power generation ratio signal Sd is applied from the FX-terminal, because the power generation ratio signal Sd continues to be at the low level for the period t3 when the abnormality occurs. The ECU 4 is also capable of checking the power generation ratio from the power generation ratio signal Sd.

(Third Embodiment)

In this third embodiment, the external signal receiver circuit 23 is constructed to generate the reference voltage Vr applied to the inverting input of the comparator 28 and to detect abnormality of the signal wire connecting the CX-terminal and the ECU 4. Therefore, the NAND circuit 29 shown in FIG. 1 has another (third) input to receive this abnormality detection signal from the external signal receiver circuit 23.

Figure 5:
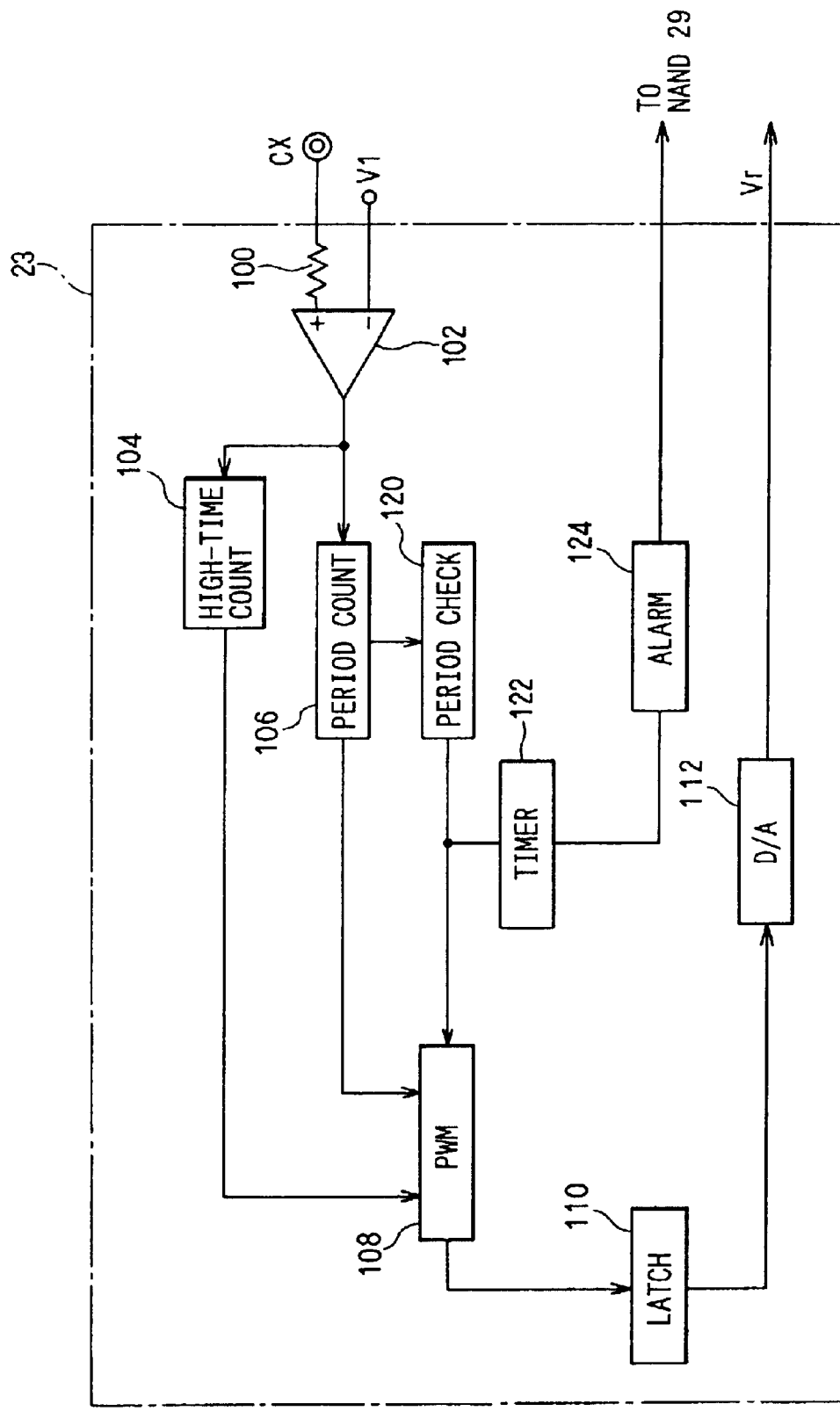
FIG. 5 is a circuit diagram showing an external signal receiver circuit used in the third embodiment of the present invention.

As shown in FIG. 5, the external signal receiver circuit 23 has a resistor 100, a voltage comparator 102, a high-time counter 104, a period counter 106, a pulse width modulation (PWM) duty calculation circuit 108, a duty latch 110, a D/A converter 112, a period check circuit 120, a monitor timer 122 and an alarm pulse generator 124.

The CX-terminal is connected to the non-inverting input of the comparator 102 through the resistor 100. The comparator 102 compares the control signal applied from the ECU 4 to its non-inverting input and indicative of the regulated output voltage in the form of the PWM signal with the reference voltage V1 applied to its inverting input. The high-time counter 104 counts the period of time of the high level in the received PWM signal. The period counter 106 counts the period of the PWM signal. The PWM duty ratio calculation circuit 108 calculates the duty ratio of the PWM signal from the two counted periods. The calculated duty ratio is stored in the duty latch 110 and then converted into an analog voltage by the A/D converter 112. This analog voltage is applied as the reference voltage Vr of the comparator Vr in FIG. 1. Thus, by varying the duty ratio of the PWM signal applied from the ECU 4, the reference voltage Vr and hence the resulting regulated voltage of the a.c. generator 1 can be varied correspondingly.

The period check circuit 120 checks whether the period of the PWM signal counted by the period counter 106 is within a predetermined range. If the signal wire connecting the CX-terminal and the ECU 4 is broken or shorted to other conductive parts, the counted period of the PWM signal increases over or decreases below the predetermined range. The check circuit 120 in such a case determines that the PWM signal is abnormal. The monitor timer 122 measures the period of time in which the abnormality detected by the check circuit 120 continues. If the measured abnormality period reaches a predetermined period, the alarm pulse generator 124 generates an alarm pulse as an abnormality detection signal. This alarm pulse may be the signal Sc of the period t2 (less than 10% duty ratio) as in the first embodiment or the signal Sc of the long period t3 as in the second embodiment. In the case of generating the signal Sc of the second embodiment, the abnormality in the control signal applied from the ECU 4 can be notified to the ECU 4 in addition to notifying the power generation condition of the a.c. generator 1.

The present invention should not be limited to the above disclosed embodiments, but may be implemented in many other ways. For instance, the abnormality may be notified by a signal of a predetermined duty ratio, which is larger than the maximum duty ratio (for instance 90%) of the power generation ratio signal. This large duty signal may be used solely or in addition to the small duty signal of the first embodiment to notify the abnormality. The periods of the high level signal and the low level signal used in the second embodiment may be varied in dependence on the types of detected abnormality.

What is claimed is:

1. A control apparatus for a vehicle a.c. generator having a field winding and a switching device connected in series with the field winding, the control apparatus comprising:
   regulator means for turning on and off the switching device in a variable duty ratio within a predetermined range at every predetermined cycle period thereby to regulate an output voltage of the generator;
   output means for outputting a power generation ratio output signal in a pulse-width modulated form, the output signal having a duty ratio corresponding to the duty ratio of the switching device;
   detection means for detecting an abnormality in the generator and producing an abnormality signal; and
   mask means for masking a part of the output signal by the abnormality signal and applying a masked signal to an external apparatus that cooperates with the control apparatus through a signal wire to control the generator, wherein the output means outputs a signal to the external apparatus.

2. The control apparatus as in claim 1, further comprising receiver means for receiving a control signal that defines an output voltage of the generator and detecting an abnormality of the control signal, the control signal being applied from the external apparatus through another signal;
   wire, wherein the mask means masks the part of the output signal when the receiver means detects the abnormality of the control signal.

3. The control apparatus as in claim 1, wherein the mask means produces the masked signal by reducing the variable duty ratio of the output signal to a duty ratio that is outside the predetermined range of the variable duty ratio.

4. The control apparatus as in claim 1, wherein the mask means produces the masked signal by passing and stopping the output signal alternately during respective periods that are longer than the period of the output signal.

5. The control apparatus as in claim 1, wherein:
   the detection means produces a logic signal as the abnormality signal upon detection of the abnormality; and
   the mask means has a logic circuit which subjects the logic signal and the output signal to a predetermined logic operation.

6. The control apparatus as in claim 5, wherein:
   the logic signal has a fixed level, while the detection means continues to detect the abnormality.

7. The control apparatus as in claim 5, wherein:
   the logic signal changes between a first level and a second level at a cycle period longer than the cycle period of the output signal, while the detection means continues to detect the abnormality.

8. A control method for a vehicle a.c. generator having a field winding and a switching device connected in series with the field winding, the control method comprising steps of:
   turning on and off the switching device in a variable duty ratio within a predetermined range at every predetermined cycle period thereby to regulate an output voltage of the generator;
   producing a power generation ratio output signal in a pulse form having a duty ratio corresponding to the duty ratio of the switching device; and
   transmitting the output signal to an external apparatus,
   wherein the transmitting step includes a step of changing the output signal depending on whether an abnormality in the a.c. generator is detected.

9. The control method as in claim 8, wherein the transmitting step changes the duty ratio of the output signal to a duty ratio that is outside the predetermined range when the abnormality is detected.

10. The control method as in claim 8, wherein the transmitting step stops transmission of the output signal to the external apparatus for a period longer than the predetermined cycle period when the abnormality is detected.

11. A control apparatus for a vehicle a.c. generator having a field winding and a switching device connected in series with the field winding, the control apparatus cooperating with an external apparatus to control the generator, the control apparatus comprising:
   regulator means for turning on and off the switching device, and for varying a duty ratio of turning on and off in every predetermined cycle period in order to regulate an output voltage of the generator, the duty ratio being variable within a predetermined range;
   output means for outputting an output signal in a pulse-width modulated form, the output signal having a duty ratio corresponding to the duty ratio of the switching device driven by the regulator means, the output signal being transmitted to the external apparatus through a signal wire;
   detection means for detecting an abnormality in a generator system including at least the generator and for producing an abnormality signal; and
   mask means for masking a part of the output signal in response to the abnormality signal so that the output signal is modulated into a form that is distinctive from the form obtained by switching the switching device by the regulator means during a period when no abnormality is detected thereby to transmit the abnormality signal from the control apparatus to the external apparatus through the signal wire.

12. The control apparatus as in claim 11, further comprising:
   receiver means for receiving a control signal that defines a target output voltage of the generator and detecting an abnormality of the control signal, the control signal being applied from the external apparatus through another signal wire, wherein the regulator means varies a duty ratio of turning on and off to regulate an output voltage of the generator to the target output voltage, and the mask means performs in response to the abnormality detected by the receiver means in order to mask the part of the output signal and to transmit the abnormality of the control signal to the external apparatus through the signal wire.

13. The control apparatus as in claim 11, wherein:

the mask means produces the masked signal by reducing the variable duty ratio of the output signal to a duty ratio that is outside the predetermined range of the variable duty ratio obtained by the regulator means.

14. The control apparatus as in claim 11, wherein:

the mask means produces the masked signal by passing and stopping the output signal alternately during respective periods that are longer than the predetermined cycle period of the output signal.

15. The control apparatus as in claim 11, wherein:

the detection means produces a logic signal as the abnormality signal upon detection of the abnormality; and the mask means has a logic circuit which subjects the logic signal and the output signal to a predetermined logic operation.

16. The control apparatus as in claim 15, wherein:

the logic signal has a fixed level, while the detection means continues to detect the abnormality.

17. The control apparatus as in claim 15, wherein:

the logic signal changes between a first level and a second level at a cycle period longer than the predetermined cycle period of the output signal, while the detection means continues to detect the abnormality.

* * * * *